US012763488B2

(12) United States Patent
Li et al.

(10) Patent No.: US 12,763,488 B2
(45) Date of Patent: Oct. 13, 2026

(54) LOW-FREQUENCY FILTERING UNIT HAVING PATTERN WITH HIGH CONSISTENCY AND ANTENNA ARRAY

(71) Applicants: Jiangsu Hengxin Technology Co., Ltd., Yixing (CN); Jiangsu Hengxin Wireless Technology Co., Ltd., Yixing (CN)

(72) Inventors: Shu Li, Yixing (CN); Jian Sun, Yixing (CN); Xianyu Xie, Yixing (CN); Long Zhang, Yixing (CN); Yanping Hua, Yixing (CN); Huibing Wang, Yixing (CN)

(73) Assignees: Jiangsu Hengxin Technology Co., Ltd., Jiangsu (CN); Jiangsu Hengxin Wireless Technology Co., Ltd., Jiangsu (CN)

( * ) Notice: Subject to any disclaimer, the term of this patent is extended or adjusted under 35 U.S.C. 154(b) by 757 days.

(21) Appl. No.: 18/034,116

(22) PCT Filed: Aug. 23, 2022

(86) PCT No.: PCT/CN2022/114086
§ 371 (c)(1),
(2) Date: Jun. 11, 2024

(87) PCT Pub. No.: WO2023/216455
PCT Pub. Date: Nov. 16, 2023

(65) Prior Publication Data

US 2024/0322445 A1 Sep. 26, 2024

(30) Foreign Application Priority Data

May 9, 2022 (CN) ........................ 202210498524.2

(51) Int. Cl.
*H01Q 1/36* (2006.01)
*H01Q 1/52* (2006.01)
(Continued)

(52) U.S. Cl.
CPC ........... *H01Q 19/104* (2013.01); *H01Q 21/24* (2013.01)

(58) Field of Classification Search
CPC ............ H01Q 1/24; H01Q 1/246; H01Q 1/52; H01Q 1/521; H01Q 15/00; H01Q 15/006;
(Continued)

(56) References Cited

U.S. PATENT DOCUMENTS 9,276,323 B2 * 3/2016 Moon .................... H01Q 21/08
9,276,329 B2 * 3/2016 Jones ..................... H01Q 19/30
(Continued)

FOREIGN PATENT DOCUMENTS

CN 112821067 A 5/2021
CN 113131198 A 7/2021
CN 113437508 A 9/2021

*Primary Examiner* — Tho G Phan

(57) ABSTRACT

A low-frequency filtering unit includes a vibrator arm, a balun base, a balun feeder line and a balun chamber tube for arranging the balun feeder line; the vibrator arm includes two radiation arms, one end of the radiation arm is vertically connected to one end of the other radiation arm to form an integral L-shaped right-angle structure, the balun chamber tube is arranged at the connection between the two radiation arms, and the wave-trap structures on the transverse radiation arm and the longitudinal radiation arm are symmetrically arranged with a 45° angular bisector of the L-shaped right-angle structure as a center line; the low-frequency filtering unit is provided with four vibrator arms which are symmetrically arranged in pairs around the periphery of the balun base along a diagonal line and form an integral cross orthogonal structure, and the vibrator arms.

7 Claims, 8 Drawing Sheets

(51) Int. Cl.
*H01Q 19/10* (2006.01)
*H01Q 21/24* (2006.01)
*H01Q 21/26* (2006.01)

(58) Field of Classification Search
CPC ...... H01Q 19/10; H01Q 19/104; H01Q 21/24; H01Q 21/26; H01Q 5/42; H01Q 5/48; H01Q 1/36; H01Q 1/50; H01Q 21/00
See application file for complete search history.

(56) References Cited

U.S. PATENT DOCUMENTS

| | | | | |
|---|---|---|---|---|
| 10,680,323 | B2 * | 6/2020 | Zhang | H01Q 21/30 |
| 10,923,811 | B2 * | 2/2021 | Gonzalez | H01Q 1/38 |
| 11,489,251 | B2 * | 11/2022 | Chen | H01Q 1/523 |
| 12,244,070 | B2 * | 3/2025 | Xu | H01Q 1/246 |

* cited by examiner

LOW-FREQUENCY FILTERING UNIT HAVING PATTERN WITH HIGH CONSISTENCY AND ANTENNA ARRAY

TECHNICAL FIELD

The present invention relates to the technical field of mobile communication antennas, more specifically, referring to a low-frequency filtering unit having a pattern with high consistency and an antenna array.

BACKGROUND

With the rapid development of communication technology, development of communication base station antennas is trending towards miniaturization, integration, multi-frequency and multi-port. Due to the tight antenna layout, the large increase in the number of antenna units and ports, as well as high and low frequency nested arrays and other factors, coupling phenomenon between the antennas becomes a serious issue, and eventually causing serious deformation of the pattern, and deterioration of the isolation between ports, which seriously affects the performance of the base station antennas.

In order to solve the above technical problems, a filtering unit in the field mainly adopts a filtering branch and a filtering structure based on an LC filtering circuit and other technical solutions at present. For example, a Chinese invention patent application with a publication number of CN113437508A discloses a broadband filtering vibrator and an antenna system, which optimizes the broadband spatial filtering performance of the broadband filter vibrator by adjusting combination forms and structural size parameters of the filtering branches, and can effectively realize the broadband spatial decoupling between the high- and low-frequency radiation units in the multi-frequency miniaturized dense array base station antenna, so that the low-frequency vibrator may have little influence on the high-frequency pattern to improve the miniaturization and multi-frequency characteristics of the antenna system. For another example, a Chinese invention patent application with a publication number of CN113131198A discloses a low interference broadband filtering vibrator and an antenna array. The vibrator may avoid interference with the adjacent array by using a method of using an integrated LC circuit and a distributed LC circuit, and the special multi-filtering structure may directly cover the top of the high-frequency array, thus effectively reducing an antenna size and improving the performance of an open-wire interleaving array. For another example again, a Chinese invention patent application with a publication number of CN112821067A discloses a low-frequency vibrator unit and an antenna. A vibrator arm of a radiation sheet of the low-frequency vibrator unit is divided into a plurality of wide segments, and each two adjacent wide segments in the same vibrator arm are connected by a bending wire. By adjusting the length of the bending wire, the flow of medium and high-frequency current in the vibrator arm can be effectively suppressed, while a gap between the bending wire and a wide wire end may form a resonance circuit equivalent to a low-pass filter, which can effectively reduce the influence of the low-frequency vibrator on the radiation performance of a medium- and high-frequency radiation unit. In addition, a balance wire arranged in the vibrator arm may effectively improve the problem of the deflection of the pattern of the low-frequency vibrator and help reduce the return loss: at the same time, the introduction of two parallel open-circuit wires on the balance wire can prevent the flow of medium-frequency current in the balance wire and effectively reduce the influence of the balance wire on the medium-frequency pattern.

However, due to the limited width of the filtering branch or inductance equivalent band line used in the above technical solutions and the coupling structure at the end of the vibrating arm, a printed circuit board may only be used, which leads to a high cost. At the same time, the filtering performance of the existing solutions is easily affected by processing errors, and a filtering bandwidth range is only between 1.7 GHZ and 2.2 GHz. Therefore, the above existing technical solutions may not meet the performance requirements of the current base station antenna.

SUMMARY

Aiming at the above problems, the present invention provides a low-frequency filtering unit having a pattern with high consistency for solving a distortion problem of pattern caused by the coupling to a high-frequency array when a low-frequency unit is arranged among the high-frequency arrays, as well as solving problems of high cost, large process error and poor filtering effect in the process of adopting filtering branches and filtering structures based on an LC filtering circuit.

A low-frequency filtering unit having a pattern with high consistency comprises a vibrator arm, a balun base, a balun feeder line and a balun chamber tube for arranging the balun feeder line, wherein the vibrator arm comprises two radiation arms, the two radiation arms comprises a transverse radiation arm extending transversally and a longitudinal radiation arm extending longitudinally, one end of the transverse radiation arm is vertically connected to one end of the longitudinal radiation arm to form an integral L-shaped right-angle structure, the balun chamber tube is arranged at the connection between the transverse radiation arm and the longitudinal radiation arm, and the transverse radiation arm and the longitudinal radiation arm are provided with a wave-trap structure respectively, the wave-trap structures on the transverse radiation arm and the longitudinal radiation arm are symmetrically arranged with a 45° angular bisector of the L-shaped right-angle structure as a center line: the low-frequency filtering unit is provided with four vibrator arms, wherein the four vibrator arms are symmetrically arranged in pairs around the periphery of the balun base along a diagonal line and form an integral cross orthogonal structure, and the vibrator arms, the balun chamber tube, the balun feeder line and the balun base are all made of metal conductors.

Furthermore, the rectangular L-shaped vibrator arm formed by the vertical connection of the two radiation arms has an inner L-shaped side edge and an outer L-shaped side edge, the wave-trap structure comprises a hollow hole and a notch gap formed on the radiation arm, one end of the notch gap is communicated with the hollow hole, and the other end thereof extends from the hollow hole to the inner L-shaped side edge or the outer L-shaped side edge of the radiation arm.

Furthermore, the vibrator arm is a plate-shaped metal conductor, and the two radiation arms of the vibrator arm have downward folded edges at both ends in a width direction.

Furthermore, the length and width of the two radiation arms of the vibrator arm are equal.

Furthermore, a gap exists between two adjacent vibrator arms as well as two adjacent balun chamber tubes.

Furthermore, the four vibrator arms, the balun base and the balun cavity tubes are integrally formed by die-casting technique.

An antenna array comprises a reflecting plate and the low-frequency filtering unit having the pattern with high consistency, wherein the reflecting plate is provided with a plurality of high-frequency units and the low-frequency filtering unit having pattern with high consistency, and the low-frequency filtering unit having pattern in high consistency is arranged among the plurality of high-frequency units, and the position of the vibrator arm of the low-frequency filtering unit is higher than that of the high-frequency units.

The low-frequency filtering unit having the pattern with high consistency has the beneficial effect that the vibrator arm made of four metal conductors forms a cross orthogonal shape along the periphery of the balun base, and the four vibrator arms are symmetrically arranged along the diagonal line in pairs, while each vibrator arm is vertically connected by two radiation arms at the end to form an L-shaped right-angle structure, and a wave-trap structure is arranged on the vibrator arm, the vibrator structure of the low-frequency filtering vibrator is reconstructed through the wave-trap structure, so that the coupling current of the low-frequency filtering vibrator forms a circular flow direction at the wave-trap position, and an induced current has the same intensity, opposite flow direction and mutual offset at the symmetric position of the wave-trap structure, which can effectively eliminate the influence of the coupling between the high and low frequencies on the high-frequency vibrator, thus keeping the pattern with high consistency: at the same time, the existing problems of high cost caused by the adoption of printed integrated circuits and the influence of processing errors on the filtering performance are effectively avoided.

Figure 1:
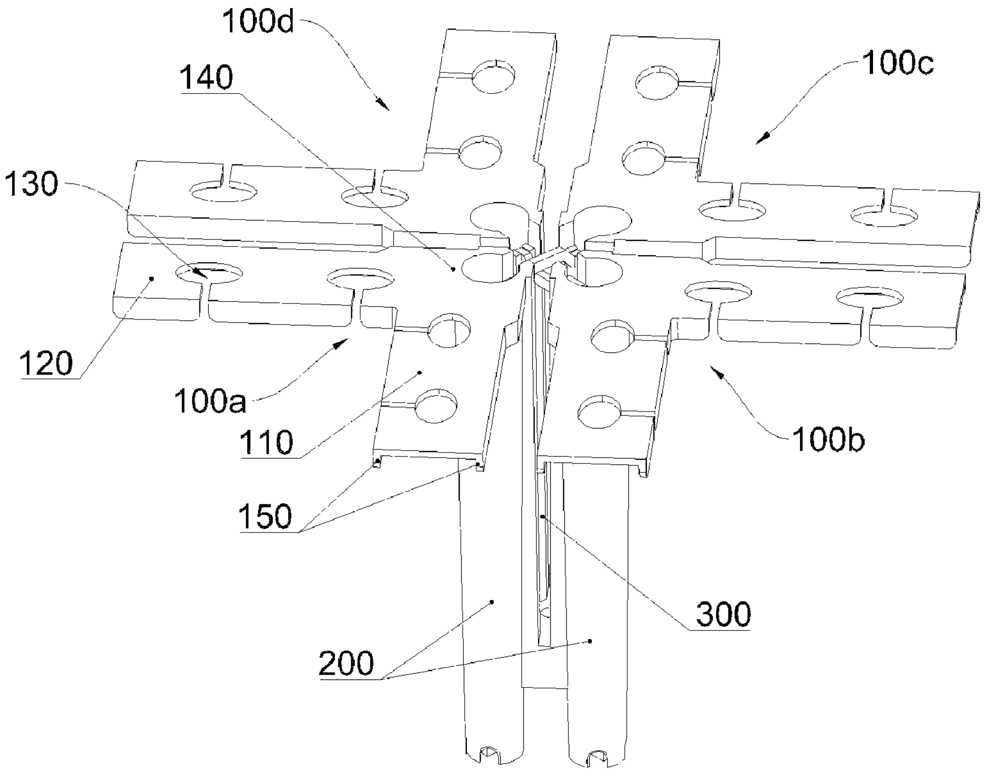
FIG. 1 is a three-dimensional schematic diagram of a low-frequency filtering unit having a pattern with high consistency in the present invention.

Numeral references: 100*a* refers to first vibrator arm, 100*b* refers to second vibrator arm, 100*c* refers to third vibrator arm, 100*d* refers to fourth vibrator arm, 110 refers to longitudinal radiation arm, 120 refers to transverse radiation arm, 130 refers to wave-trap structure, 131 refers to notch gap, 132 refers to hollow hole, 140 refers to connection between the transverse radiation arm and the longitudinal radiation arm, 150 refers to folded edge, 160 refers to L-shaped inner side edge, 170 refers to L-shaped outer side edge, 200 refers to balun chamber tube, 210*a* refers to balun feeder line, 210*b* refers to balun feeder line, 300 refers to balun base, 400 refers to high-frequency unit, 500 refers to reflecting plate, and 600 refers to strong coupling current.

DETAILED DESCRIPTION

As shown in FIG. 1 to FIG. 4, a low-frequency filtering unit having a pattern with high consistency comprises a vibrator arm, a balun base 300, a balun feeder line and a balun chamber tube 200 for arranging the balun feeder line, wherein the vibrator arm comprises two radiation arms, the two radiation arms comprises a transverse radiation arm 120 extending transversally and a longitudinal radiation arm 110 extending longitudinally, one end of the transverse radiation arm 120 is vertically connected to one end of the longitudinal radiation arm 110 to form an integral L-shaped right-angle structure, a connection 140 between the transverse radiation arm 120 and the longitudinal radiation arm 110 is provided with the balun chamber tube 200, and the transverse radiation arm 120 and the longitudinal radiation arm 110 are provided with a wave-trap structure 130 respectively, the wave-trap structures on the transverse radiation arm 120 and the longitudinal radiation arm 110 are symmetrically arranged with a 45° angular bisector of the L-shaped right-angle structure as a center line, therefore, the wave-trap structures on the transverse radiation arm 120 and wave-trap structures on the longitudinal radiation arm 110 have the same number and are in the same shape and size: the low-frequency filtering unit is provided with four vibrator arms, wherein the four vibrator arms refers to a first vibrator arm 100*a*, a second vibrator arm 100*b*, a third vibrator arm 100*c* and a fourth vibrator arm 100*d*, the four vibrator arms are symmetrically arranged in pairs around the periphery of the balun base 300 along a diagonal line and form an integral cross orthogonal structure. In the embodiment, the first vibrator arm 100*a* and the third vibrator arm 100*c* are symmetric along the diagonal line, the second vibrator arm 100*b* and the fourth vibrator arm 100*d* are symmetric along the diagonal line, and the four vibrator arms, the balun chamber tube 200, the balun feeder line and the balun base 300 are all made of metal conductors.

Figure 2:
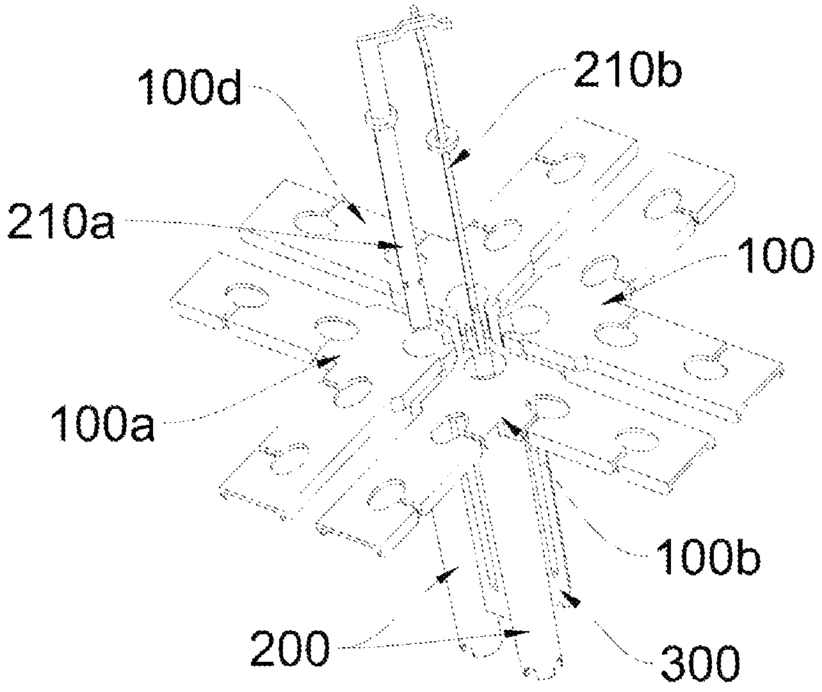
FIG. 2 is a local decomposition schematic diagram of the low-frequency filtering unit having the pattern with high consistency in the present invention.
Figure 3:
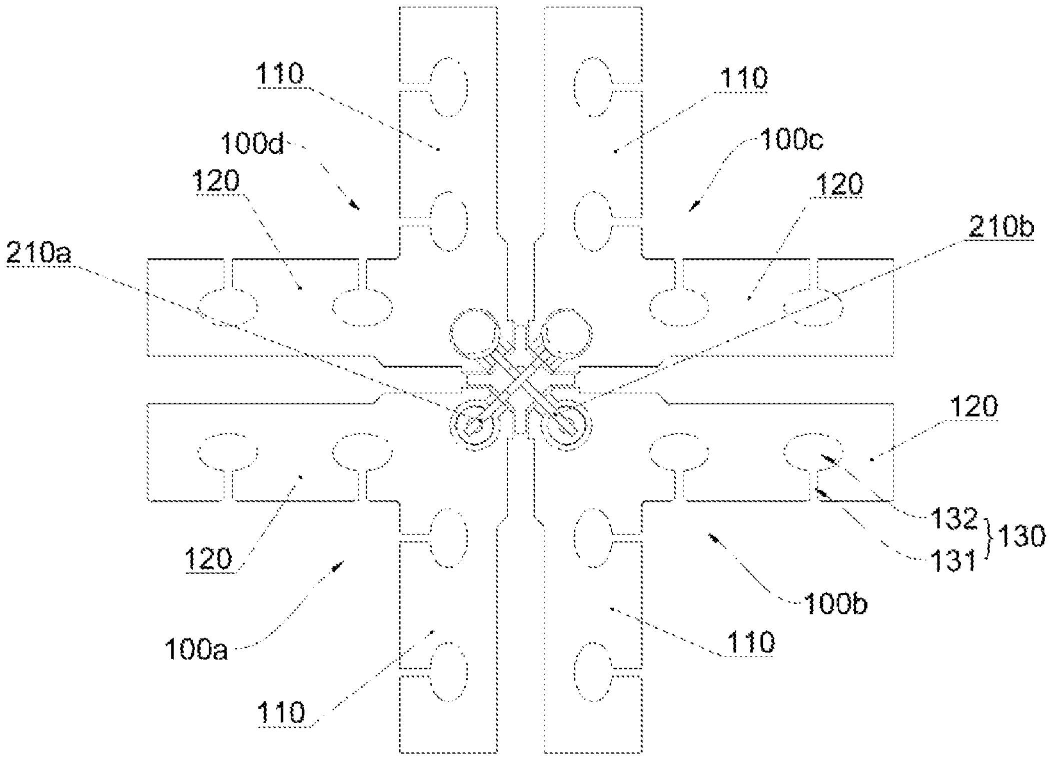
FIG. 3 is a top view schematic diagram of the low-frequency filtering unit having the pattern with high consistency in the present invention.

The low-frequency filtering unit having the pattern with high consistency in the present invention can arrange the balun feeder line according to the actual feeding mode. The embodiment uses a balun direct feeding mode, as shown in FIG. 2. The balun feeder line 210*a* is arranged in the balun chamber tube connected to the first vibrator arm 100*a*, and the balun feeder line 210*b* is arranged in the balun chamber tube connected to the second vibrator arm 100*b*; the balun feeder line 210*a* excites a low-frequency vibrator comprising the first vibrator arm 100*a* and the third vibrator arm 100*c* to form +45° polarization; the balun feeder line 210*b* excites a low-frequency vibrator comprising the second vibrator arm 100*b* and the fourth vibrator arm 100*d*, forming −45° polarization. If a coupling feeding mode is adopted, the balun chamber tubes of the four vibrator arms are provided with the balun feeder line inside respectively.

Figure 4:
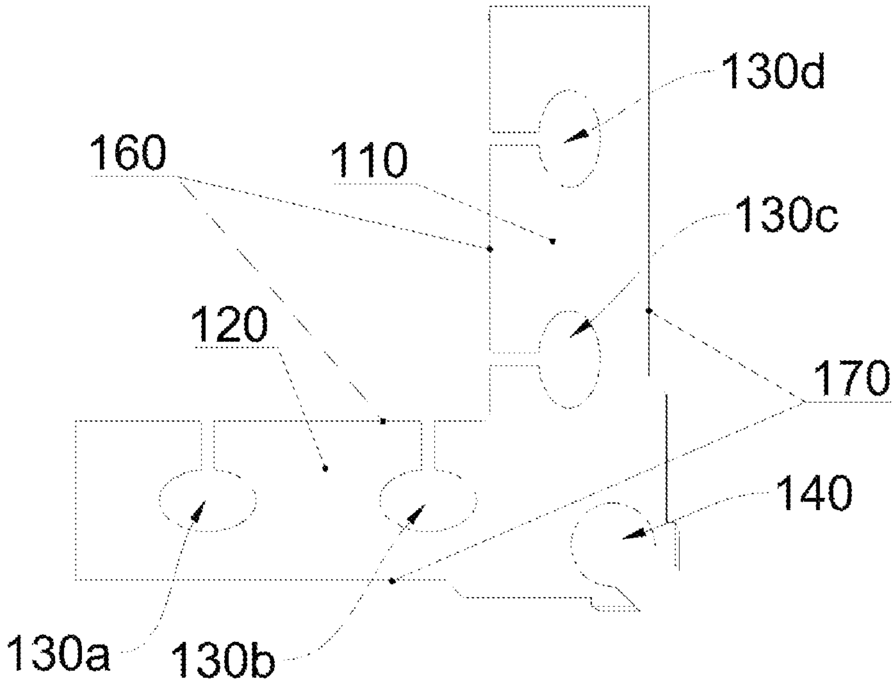
FIG. 4 is an enlarged schematic diagram of a vibrator arm in the present invention.
Figure 5:
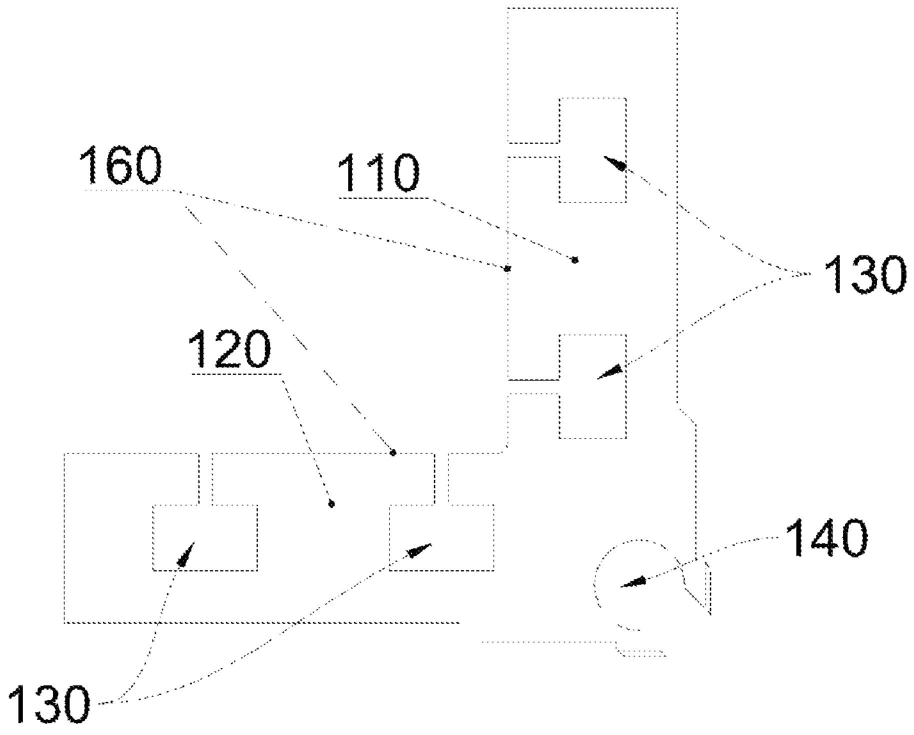
FIG. 5 is an enlarged schematic diagram of the second embodiment of the vibrator arm in the present invention.

The vibrator arm with the L-shaped right-angle structure formed by the vertically connecting the two radiation arms, namely the transverse radiation arm 120 and the longitudinal radiation arm 110, has an L-shaped inner side edge 160 and an L-shaped outer side edge 170. The wave-trap structure 130 comprises a hollow hole 132 and a notch gap 131 formed on the radiation arm. One end of the notch gap 131 is communicated with the hollow hole 132, and the other end of the notch gap 131 extends from the hollow hole 132 to the L-shaped inner side edge 160 of the radiation arm or to the L-shaped outer side edge 170 of the radiation arm. In the embodiment, the notch gap 131 extends from the hollow hole 132 to the L-shaped inner side edge 160 of the radiation arm. The shape of the hollow hole 132 may be regular or irregular polygons, such as square, rectangle, diamond, pentagon, hexagon, etc., and the hollow hole 132 may also be circular or elliptical. The number of wave-trap structures on each radiation arm of the vibrator arm may be one or more. In the embodiment, each of the two radiation arms are provided with two wave-trap structures, wherein the two wave-trap structures on the transverse radiation arm 120 are the wave-trap structure 130*a* and the wave-trap structure 130*b* respectively, and the two wave-trap structures on the longitudinal radiation arm 110 are the wave-trap structure 130*c* and the wave-trap structure 130*d* respectively, while the wave-trap structure 130*a* and wave-trap structure 130*d*, the wave-trap structure 130*b* and the wave-trap structure 130*c* are axially symmetrical with the 45° angular bisector of the transverse radiation arm 120 and the longitudinal radiation arm 110 as the center line. As shown in FIG. 4, the hollow hole 132 of the wave-trap structure 130 in the embodiment is elliptical. FIG. 5 shows another embodiment of the wave-trap structure 130, and the hollow hole 132 is rectangular.

As a preferred technical solution, the vibrator arms are all plate-shaped metal conductors, and the two radiation arms of the vibrator arm, namely the transverse radiation arm 120 and the longitudinal radiation arm 110, have downward folded edges 150 at both ends of the respective width directions; and the setting of folded edges 150 may play an effective role in strengthening the structural intensity of the vibrator arm.

As a further preferred technical solution, the length and width of the two radiation arms forming the vibrator arm 100 are equal: gaps exist between the two adjacent vibrator arms and between the balun chamber tubes.

Figure 6:
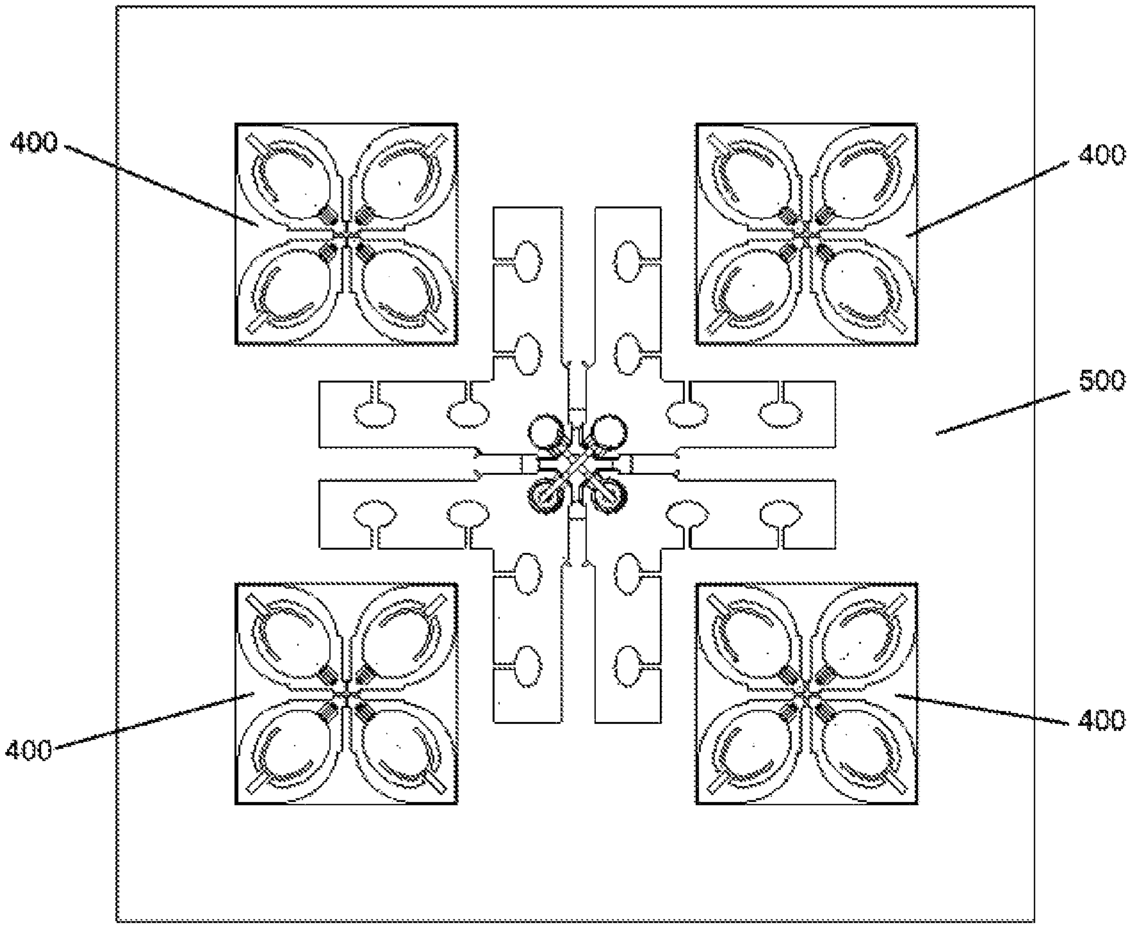
FIG. 6 is a layout schematic diagram of an antenna array in the present invention.

See FIG. 6, an antenna array comprises a reflecting plate 500. The reflecting plate 500 is provided with a plurality of high-frequency units 400 and low-frequency filtering units having the pattern with high consistency. The low-frequency filtering units having the pattern with high consistency are arranged among the plurality of high-frequency units 400, and the position of the vibrator arm of the low-frequency filtering unit is higher than the high-frequency units 400. In this environment, the size of the wave-trap structure 130 on the vibrator arm is influenced by the model selection of the high-frequency unit 400, the position relationship between the high-frequency unit and the low-frequency unit, the operating frequency and other factors.

Figure 7:
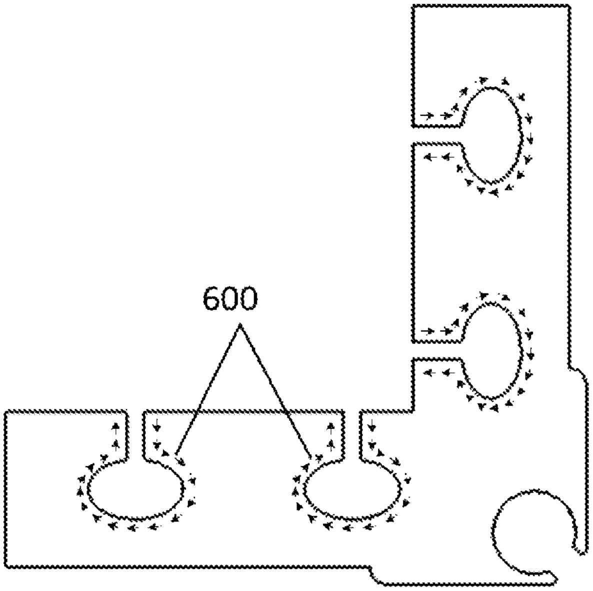
FIG. 7 is a schematic diagram of a wave-trap structure coupling current of the low-frequency filtering unit having the pattern with high consistency in the present invention under in the array layout.

FIG. 7 is a schematic diagram of the coupling current 600 of the wave-trap structure 130 in the above environment. In the antenna array co-arrayed with the high-frequency unit 400, an electric field generated by the excitation of the high-frequency unit 400 is upward, and the coupling current 600 is generated by the coupling of the low-frequency vibrator, leading to the distortion of the pattern. The low-frequency filtering unit having the pattern with high consistency is in the direction of the electric field of the high-frequency unit 400. As the strong coupling current 600 generated by the metal gap 131 forms a loop through the edge of the metal hollow 312, the coupling current 600 has the same intensity and opposite direction, so as to offset each other.

Figure 8:
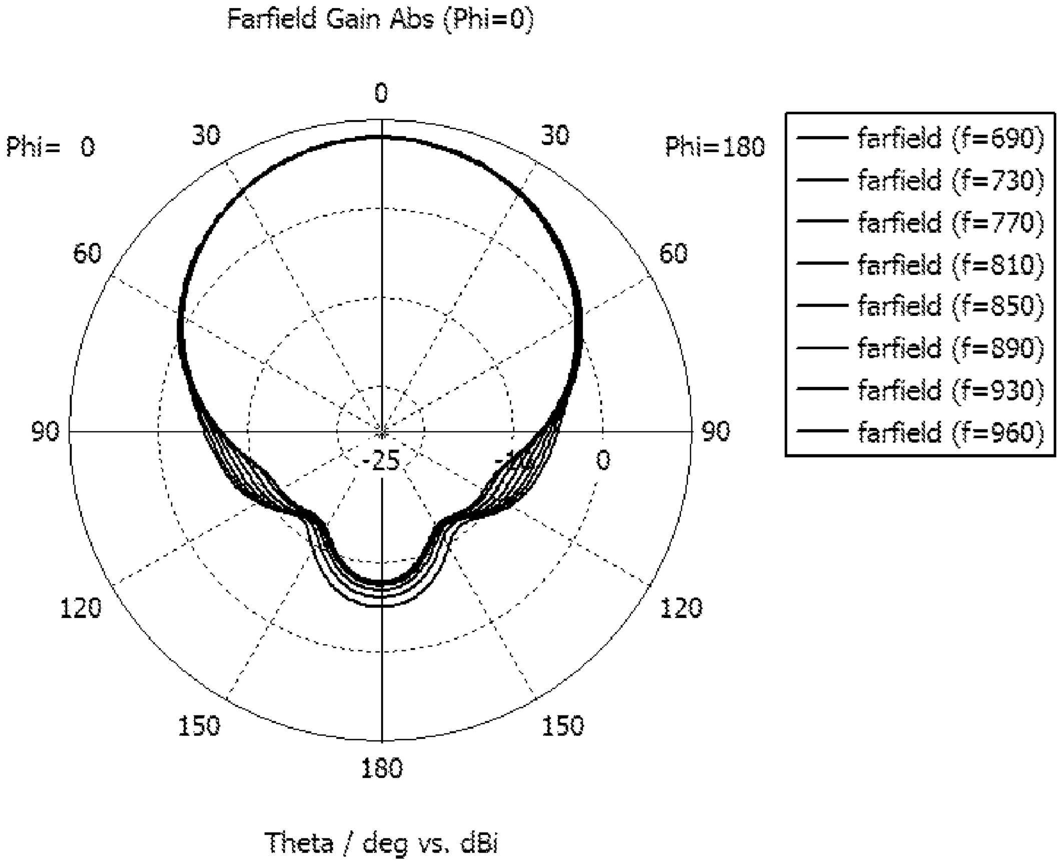
FIG. 8 is a radiation pattern of the low-frequency filtering unit having the pattern with high consistency in the present invention.
Figure 9:
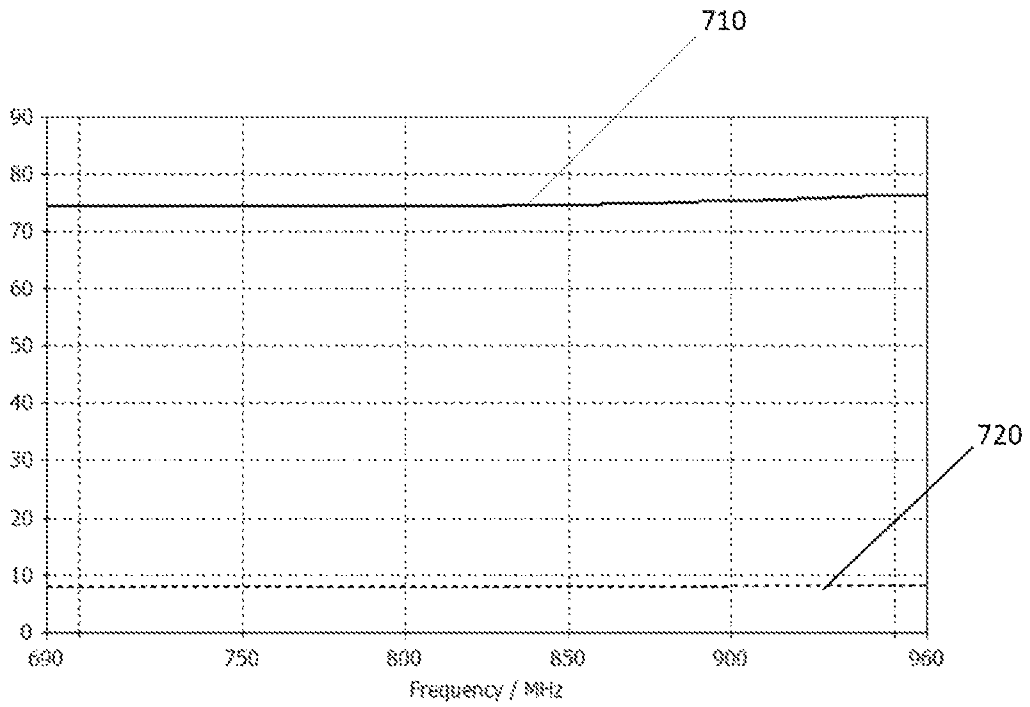
FIG. 9 is a curve diagram of the gain and wave width of the low-frequency filtering unit having the pattern with high consistency varying along with the frequency in the present invention.
Figure 10:
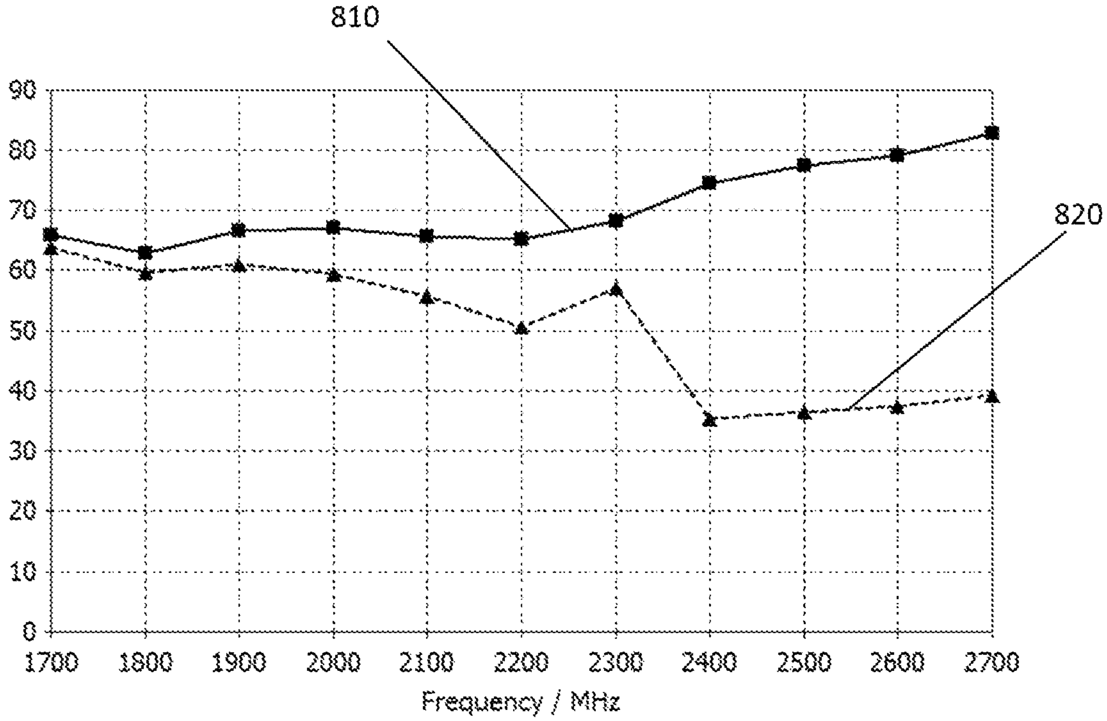
FIG. 10 is a schematic diagram of a high-frequency half-power beam width vibrated along with frequency when the conventional low-frequency unit and the low-frequency filtering unit having pattern with high consistency in the present invention are respectively arranged based on high-low-frequency arrays.

The low-frequency filtering unit having the pattern with high consistency in the present invention is designed and verified via CST. FIG. 8 shows a radiation pattern from 690 MHz to 960 MHz of the low-frequency filtering unit having the pattern with high consistency in the present invention through CST simulation. The results show that the pattern has high consistency. It can be seen from the curve diagram (FIG. 9) of the gain and wave width of the low-frequency filtering unit having the pattern with high consistency varying along with the frequency in the present invention that the gain 710 of the low-frequency filtering unit having the pattern with high consistency is 7.93 dBi±0.08 dBi, and the half-power beam width 720 is 75.4°±1.1°, which has highly consistent radiation pattern characteristics in the wide frequency band (690 MHz-960 MHz), and has significant improvement on the problem of inconsistent signal coverage caused by different frequencies.

In addition, in the array environment as shown in FIG. 6, when the existing low-frequency unit without the wave-trap structure and the low-frequency filtering unit having the pattern with high consistency in the present invention are respectively arranged among the high-frequency unit 400 arrays, the variation of the horizontal half-power beam width of the high-frequency unit 400 array along with the frequency is shown in FIG. 8. When the low-frequency unit is an existing unit without the wave-trap structure, it can be seen from a curve 810 of the high-frequency half-power beam width varying with frequency that the beam is deformed due to the coupling of high and low frequencies, resulting in significant changes in the high-frequency horizontal half-power beam width since 2100 MHz. While adopting the low-frequency filtering unit having the pattern with high consistency in the present invention, it can be seen from a curve 820 of the high-frequency half-wave beam width varying with frequency that the abrupt change of wave width caused by the high-low frequency coupling is improved.

The technology involved in the low-frequency filtering unit having the pattern with high consistency in the present invention may effectively improve the pattern consistency of the low-frequency unit, and effectively improve the influence of the low-frequency unit on the high-frequency beam in the process of high-low frequency array formation, and as the structure is easy to achieve, die-cast integrated molding may be adopted, which has a lower cost than the design scheme of the branch filtering and LC filtering circuit, etc., and thus it can be widely used in the field of mobile communication antenna.

The specific implementation of the present invention is described in detail above, but the content is only a preferred implementation scheme of the prevent invention and cannot be considered to limit the implementation scope of the present invention. All equal vibrations and improvements made according to the application scope of the present invention shall still fall within the scope of the patent of the present invention.

The invention claimed is:

1. A low-frequency filtering unit comprising four vibrator arms, a balun base, a balun feeder line and a plurality of balun chamber tubes for arranging the balun feeder line, wherein each vibrator arm further comprises two radiation arms, and the two radiation arms further comprise a transverse radiation arm extending transversally and a longitudinal radiation arm extending longitudinally, wherein one end of the transverse radiation arm is vertically connected to one end of the longitudinal radiation arm to form an integral L-shaped right-angle structure, wherein each balun chamber tube is arranged at the connection between the transverse radiation arm and the longitudinal radiation arm, wherein the transverse radiation arm and the longitudinal radiation arm are provided with a wave-trap structure respectively, wherein the wave-trap structures on the transverse radiation arm and the longitudinal radiation arm are symmetrically arranged with a 45° angular bisector of the L-shaped right-angle structure as a center line; wherein the four vibrator arms are symmetrically arranged in pairs around the periphery of the balun base along a diagonal line and form an integral cross orthogonal structure, and wherein the four vibrator arms, the balun chamber tubes, the balun feeder line and the balun base are all made of metal conductors.

2. The low-frequency filtering unit according to claim 1, wherein each vibrator arm formed by the vertical connection of the two radiation arms comprises an inner L-shaped side edge and an outer L-shaped side edge, wherein the wave-trap structure comprises a hollow hole and a notch gap formed on each of the two radiation arms, wherein one end of the notch gap is communicated with the hollow hole, and wherein the other end thereof extends from the hollow hole to the inner L-shaped side edge or the outer L-shaped side edge of each of the two radiation arms.

3. The low-frequency filtering unit according to claim 1, wherein each vibrator arm is a plate-shaped metal conductor, and wherein the two radiation arms of each vibrator arm have downward folded edges at both ends in a width direction.

4. The low-frequency filtering unit according to claim 1, wherein the length and width of the two radiation arms of each vibrator arm are equal.

5. The low-frequency filtering unit according to claim 1, wherein a first gap is formed between two adjacent vibrator arms and a second gap is formed between two adjacent balun chamber tubes.

6. The low-frequency filtering unit according to claim 1, wherein the four vibrator arms, the balun base and the balun chamber tubes are integrally formed by die-casting technique.

7. An antenna array comprising a reflecting plate and the low-frequency filtering unit according to any one of claims 1 to 6, wherein the reflecting plate is provided with a plurality of high-frequency units and the low-frequency filtering unit, and the low-frequency filtering unit is arranged among the plurality of high-frequency units, and the position of each vibrator arm of the low-frequency filtering unit is higher than that of the plurality of high-frequency units.

* * * * *